(12) United States Patent
Enriquez

(10) Patent No.: US 7,182,366 B2
(45) Date of Patent: Feb. 27, 2007

(54) INFLATABLE CURTAIN DEPLOYMENT RAMP

(75) Inventor: Adan Beltran Enriquez, Washington, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 168 days.

(21) Appl. No.: 10/819,752

(22) Filed: Aug. 27, 2004

(65) Prior Publication Data

US 2006/0043703 A1 Mar. 2, 2006

(51) Int. Cl.
*B60R 21/213* (2006.01)

(52) U.S. Cl. .................. 280/730.2; 280/728.2

(58) Field of Classification Search ............ 280/728.2, 280/730.2, 728.3
See application file for complete search history.

(56) References Cited

U.S. PATENT DOCUMENTS

| | | | |
|---|---|---|---|
| 5,791,683 A | 8/1998 | Shibata et al. | |
| 6,022,044 A | 2/2000 | Cherry | |
| 6,079,732 A | 6/2000 | Nakajima et al. | |
| 6,142,509 A | 11/2000 | White, Jr. et al. | |
| 6,149,185 A | 11/2000 | White, Jr. et al. | |
| 6,217,061 B1 | 4/2001 | Harland et al. | |
| 6,254,123 B1 | 7/2001 | Urushi et al. | |
| 6,257,616 B1 | 7/2001 | Nowak et al. | |
| 6,361,069 B1 | 3/2002 | Saito et al. | |
| 6,364,349 B1* | 4/2002 | Kutchey et al. | 280/730.2 |
| 6,439,598 B1 | 8/2002 | Braun et al. | |
| 6,530,594 B1 | 3/2003 | Nakajima et al. | |
| 6,616,175 B2 | 9/2003 | Hofmann et al. | |
| 6,793,241 B2 | 9/2004 | Wallner et al. | |
| 6,886,858 B2* | 5/2005 | Olson | 280/743.2 |
| 2003/0146606 A1 | 8/2003 | Hanjono | |
| 2003/0178824 A1 | 9/2003 | Ogata | |
| 2004/0108693 A1* | 6/2004 | Foster et al. | 280/730.2 |
| 2005/0046154 A1* | 3/2005 | Rhea et al. | 280/730.2 |
| 2005/0173902 A1* | 8/2005 | Boxey | 280/730.2 |

FOREIGN PATENT DOCUMENTS

EP 0904992 3/1999

\* cited by examiner

*Primary Examiner*—David R. Dunn
(74) *Attorney, Agent, or Firm*—Tarolli, Sundheim, Covell & Tummino LLP

(57) ABSTRACT

An apparatus (10) helps protect an occupant of a vehicle (12) that has a roof (18), a side structure (16), and a trim piece (310, 312) overlying the side structure. The apparatus (10) includes an inflatable curtain (14) that is inflatable away from the vehicle roof (18) to a position adjacent the side structure (16) of the vehicle (12). A deployment ramp (180, 270) is movable from a stored position to a deployed position for directing the inflatable curtain (14) to deploy inboard of the trim piece (310, 312). The deployment ramp (180, 270) has a construction that is sufficiently resilient and rigid to direct the inflatable curtain (14) to deploy inboard of the trim piece (310, 312). A connector piece (162, 252) connects the deployment ramp (180, 270) to the vehicle (12). The connector piece (162, 252) has a first portion (174, 264) secured to the deployment ramp (180, 270) and a second portion (168, 258) connectable to the vehicle (12). The connector piece (162, 252) has a construction that is sufficiently non-resilient and flexible so as to permit substantially unrestricted movement of the deployment ramp (180, 270) to the deployed position.

19 Claims, 7 Drawing Sheets

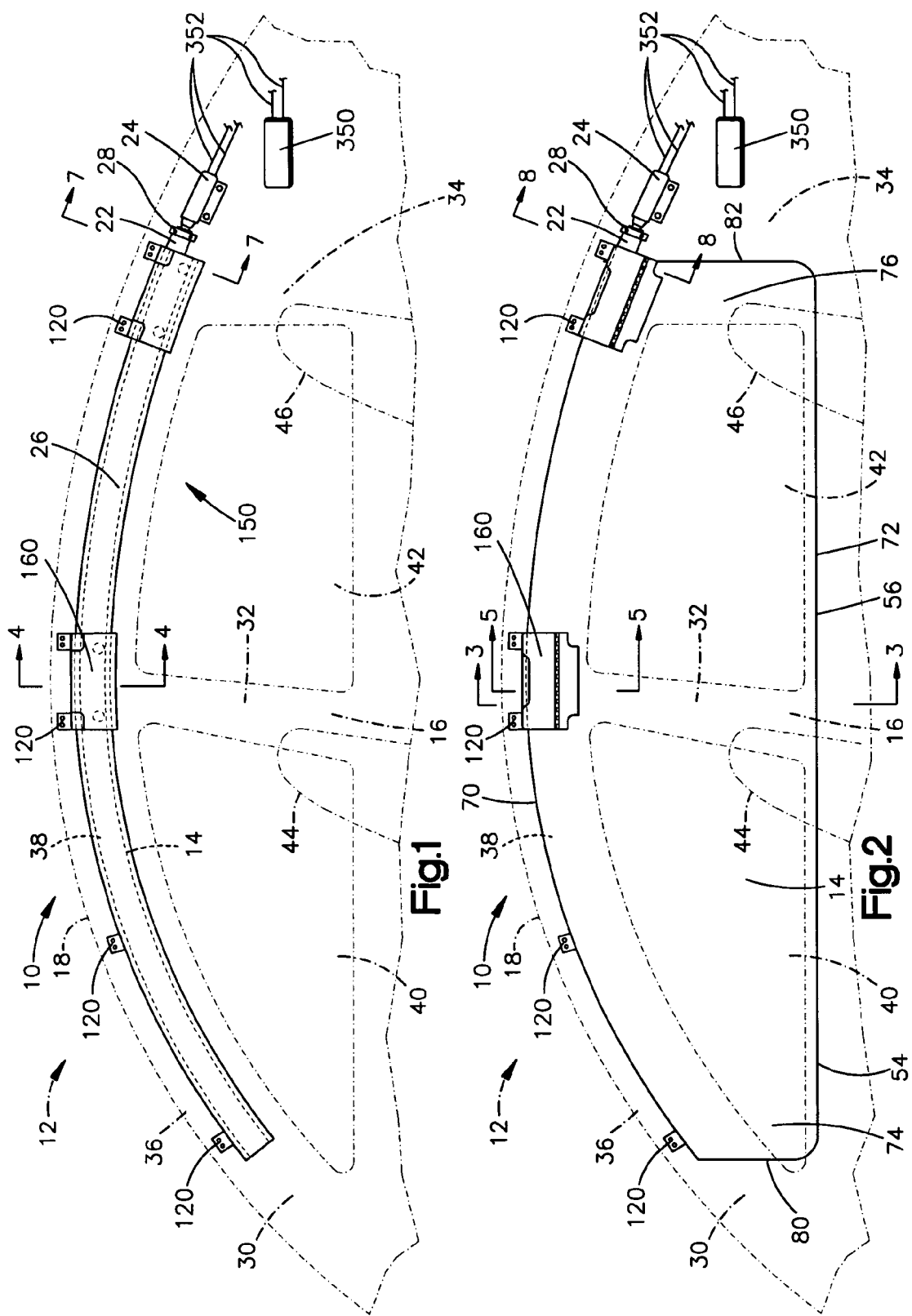

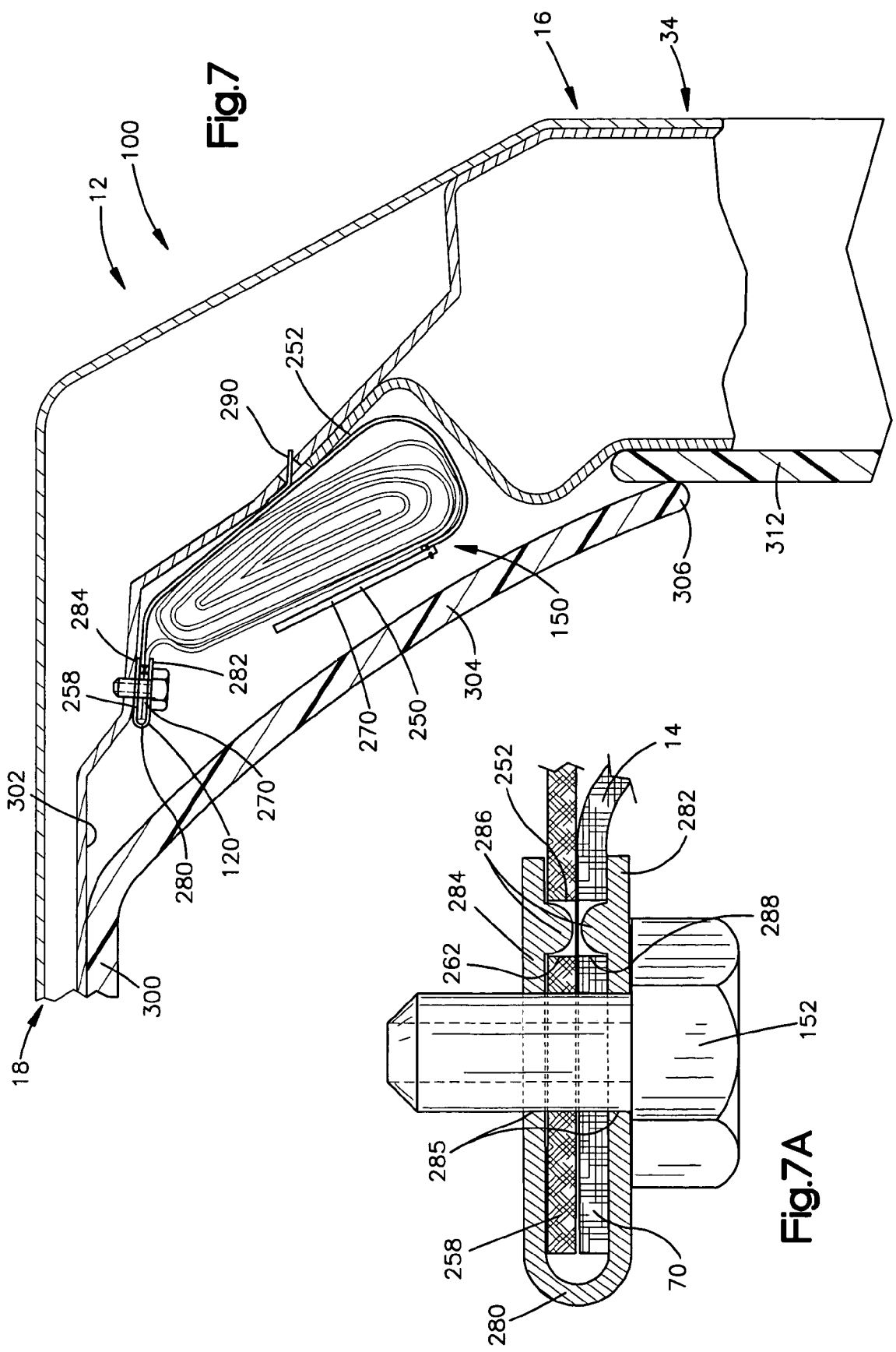

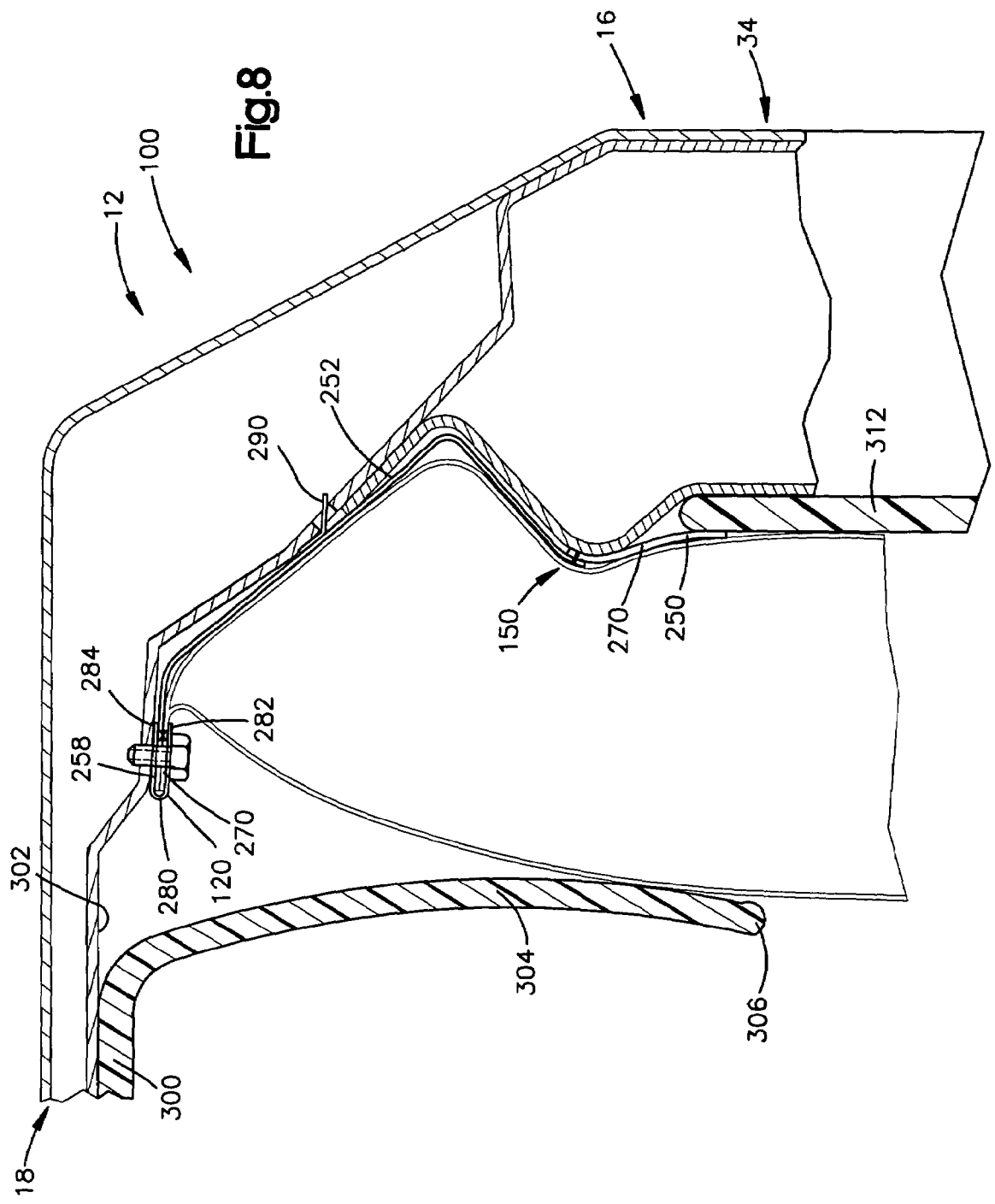

INFLATABLE CURTAIN DEPLOYMENT RAMP

FIELD OF THE INVENTION

The present invention relates to an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant. One particular type of inflatable vehicle occupant protection device is an inflatable curtain. The inflatable curtain is inflatable away from the roof of the vehicle between a vehicle occupant and the side structure of the vehicle in response to a side impact to the vehicle and/or a vehicle rollover. A known inflatable curtain is inflated from a deflated condition with inflation fluid directed from an inflator to the inflatable curtain.

SUMMARY OF THE INVENTION

The present invention relates to an apparatus for helping to protect an occupant of a vehicle that has a roof, a side structure, and a trim piece overlying the side structure. The apparatus includes an inflatable curtain that is inflatable away from the vehicle roof to a position adjacent the side structure of the vehicle. A deployment ramp is movable from a stored position to a deployed position for directing the inflatable curtain to deploy inboard of the trim piece. The deployment ramp has a construction that is sufficiently resilient and rigid to direct the inflatable curtain to deploy inboard of the trim piece. The apparatus also includes a connector piece for connecting the deployment ramp to the vehicle. The connector piece has a first portion secured to the deployment ramp and a second portion connectable to the vehicle. The connector piece has a construction that is sufficiently non-resilient and flexible so as to permit substantially unrestricted movement of the deployment ramp to the deployed position.

The present invention also relates to an apparatus for directing an inflatable curtain to deploy inboard of a trim piece overlying a side structure of a vehicle. The apparatus includes a plastic deployment ramp for directing the inflatable curtain to deploy inboard of the trim piece. The apparatus also includes a fabric connector piece for connecting the deployment ramp to the vehicle. The connector piece has a first portion connected to the deployment ramp and a second portion connectable to the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant illustrating the apparatus in a deflated and stored condition in a vehicle, according to a first embodiment of the present invention;

FIG. 2 is a schematic view of the apparatus of FIG. 1 in an inflated condition in the vehicle;

FIG. 7 is a sectional view taken generally along line 7—7 in FIG. 1;

FIG. 7A is a magnified sectional view of a portion of the apparatus of FIG. 7;

FIG. 8 is a sectional view taken generally along line 8—8 in FIG. 2; and

DESCRIPTION OF AN EMBODIMENT

Figure 3:
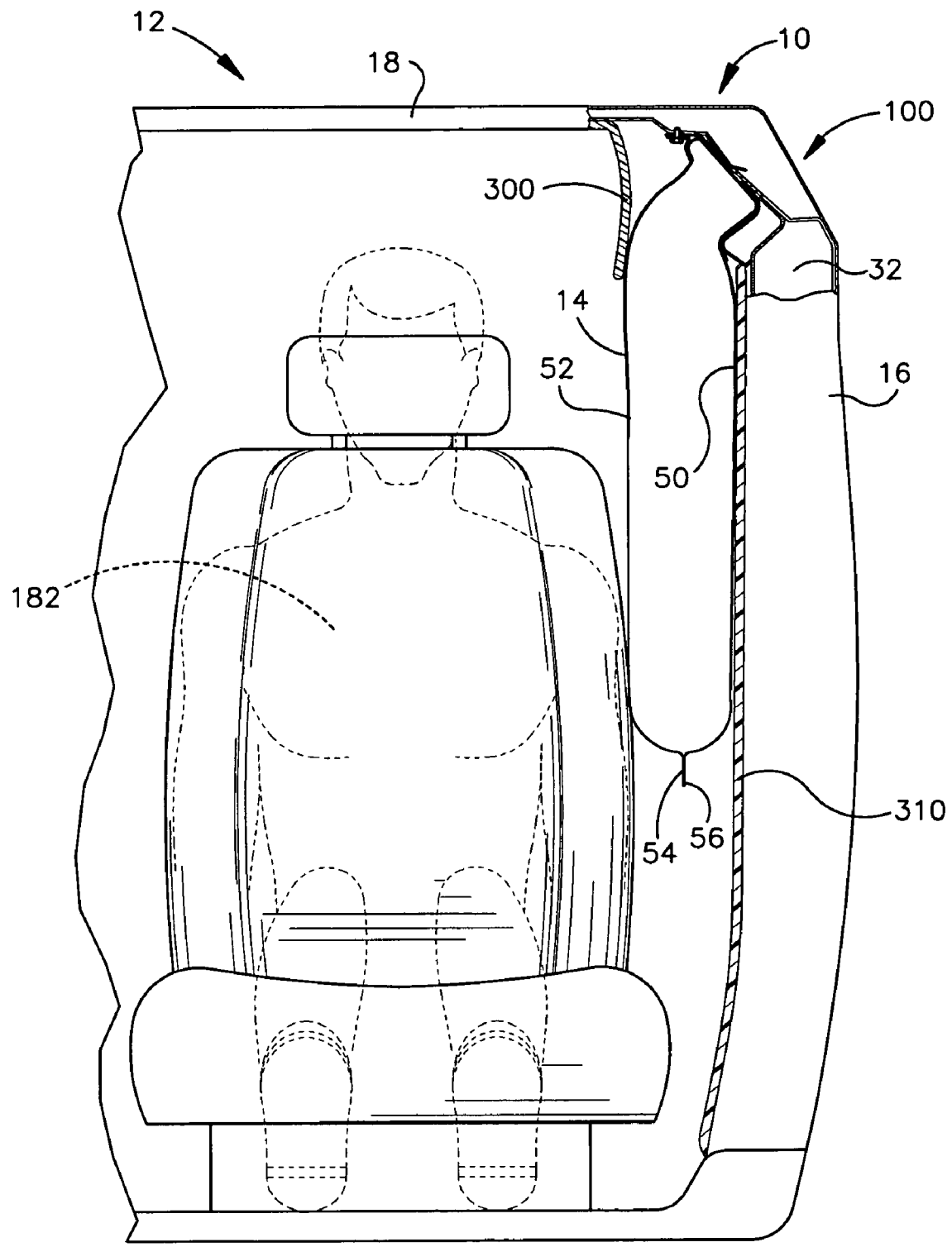
FIG. 3 is a sectional view taken generally along line 3—3 in FIG. 2.

Representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes an A pillar 30, a B pillar 32, a C pillar 34, and front and rear side windows 40 and 42. The vehicle 12 also includes front vehicle seating 44 positioned adjacent the front side window 40 and rear vehicle seating 46 positioned adjacent the rear side window 42.

An inflator 24 is connected in fluid communication with the inflatable curtain 14. In the illustrated embodiment, the inflatable curtain 14 includes a neck portion 22 that is secured to the inflator 24 by means 28, such as a clamp. Alternatively, the neck portion 22 could be connected to the inflator 24 via a manifold (not shown). As another alternative, the apparatus 10 could include means (not shown), such as a fill tube, that has a portion located in the inflatable curtain 14 for distributing inflation fluid in the inflatable curtain 14.

The inflator 24 contains a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 may include a cover 26 (FIG. 1), such as a fabric sheath or plastic housing, that helps support the inflatable curtain 14 in a stored and deflated condition. The deflated inflatable curtain 14 and the cover 26 have an elongated configuration and extend along the vehicle roof 18 and along the side structure 16 of the vehicle 12 above the side windows 40 and 42. The inflatable curtain 14 and cover 26 can be connected to the vehicle 12 by support means 120, which are described in further detail below.

The inflatable curtain 14 (FIG. 3) includes panels 50 and 52 of material that are arranged in an overlying manner. Overlapping portions of the panels 50 and 52 are interconnected along at least a portion of a perimeter 54 of the inflatable curtain 14 to form a perimeter connection 56 of the curtain. The perimeter connection 56 helps define an inflatable volume of the inflatable curtain 14. The inflatable curtain 14 may also include interior connections (not shown) in which the overlying panels 50 and 52 are interconnected within the perimeter 54 to form non-inflatable portions that help define inflatable chambers of the curtain.

The inflatable curtain 14 may be formed in a variety of manners, such as by weaving the overlying panels 50 and 52 as a single piece of material, stitching the panels together, or interconnecting the panels via ultrasonic welding, heat bonding, or adhesives. In a one piece woven construction, the overlying panels 50 and 52 may be woven simultaneously from a material, such as nylon yarn, and may be coated with a gas impermeable material, such as urethane, or laminated with a gas impermeable film. The inflatable curtain 14 thus may have a substantially gas-tight construction. Those skilled in the art will appreciate that alternative materials, such as polyester yarn, and alternatives coatings, such as silicone, may also be used to construct the inflatable curtain 14.

The perimeter 54 (FIG. 2) of the inflatable curtain 14 is defined at least partially by an upper edge 70, an opposite lower edge 72 of the curtain, and front and rear portions 74 and 76, respectively, of the inflatable curtain spaced apart horizontally along the upper and lower edges. The front and rear portions 74 and 76 of the inflatable curtain 14 include front and rear edges 80 and 82, respectively, that are spaced horizontally apart along the upper and lower edges 70 and 72 and extend between the upper and lower edges.

Figure 4:
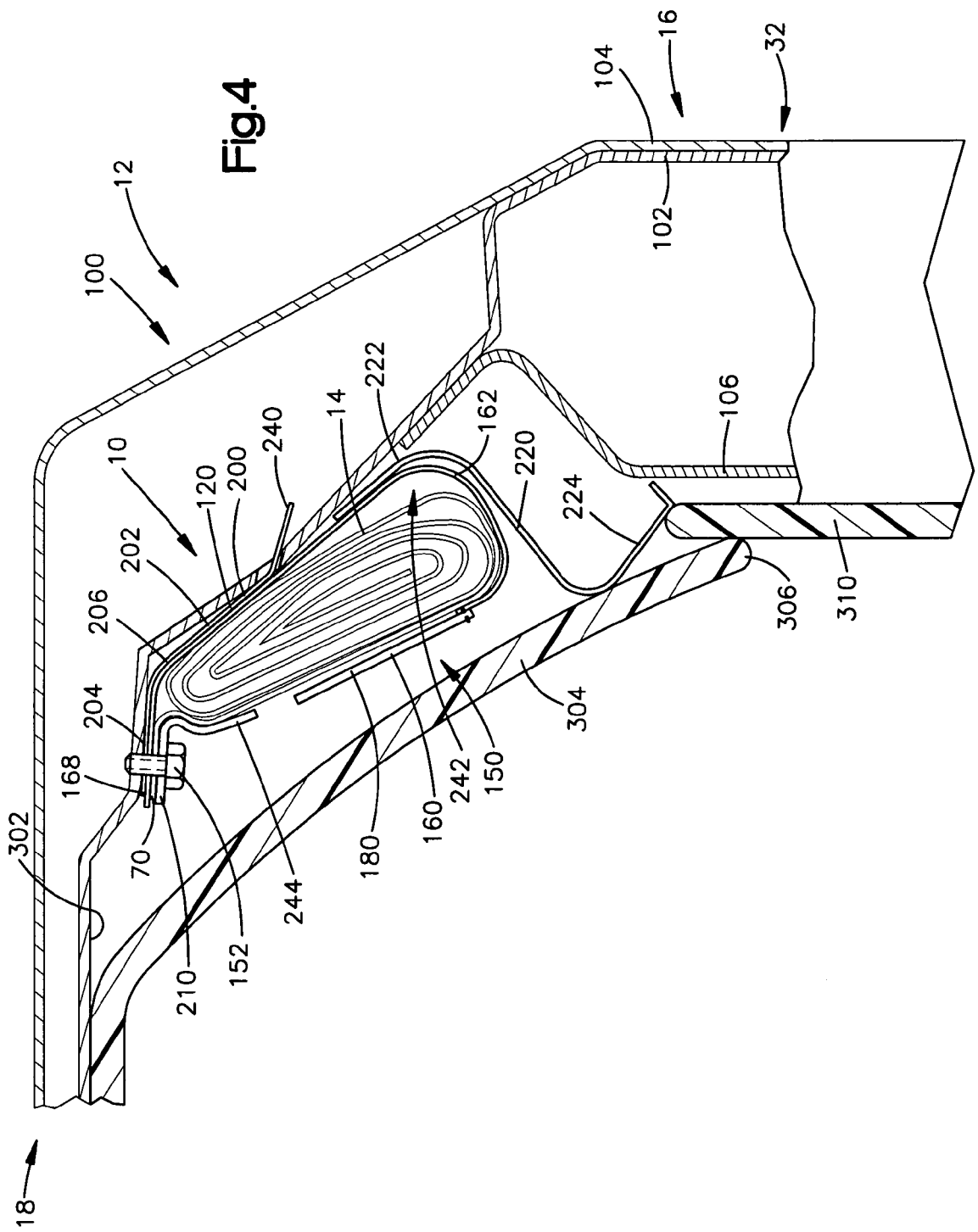
FIG. 4 is a sectional view taken generally along line 4—4 in FIG. 1.
Figure 5:
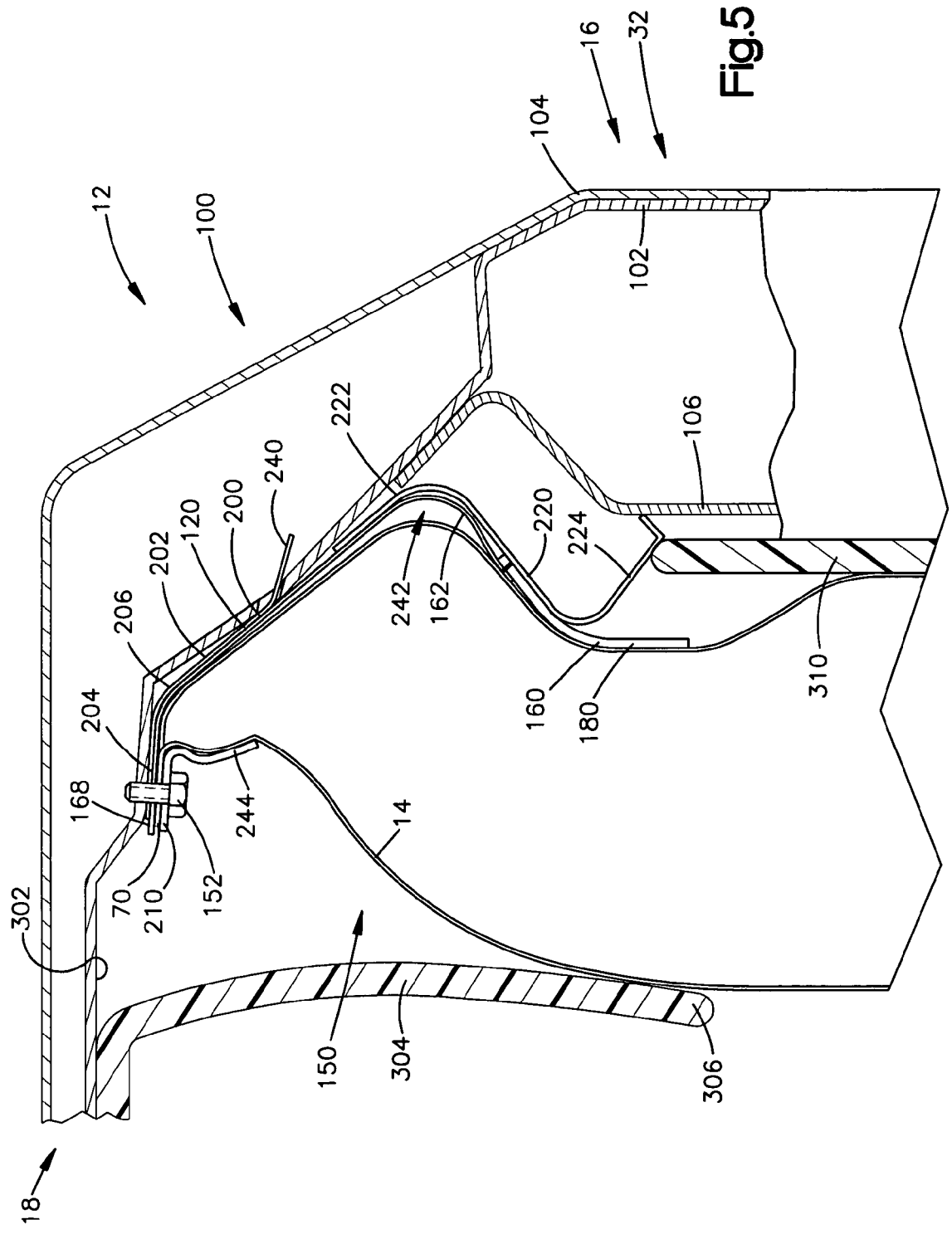
FIG. 5 is a sectional view taken generally along line 5—5 in FIG. 2.

As illustrated in FIGS. 3–5, a vehicle roof rail 100 is located at the intersection of the side structure 16 of the vehicle and the vehicle roof 18. The side structure 16, roof 18 and roof rail 100 are formed from pieces of sheet metal that are stamped or otherwise formed into predetermined shapes and welded or otherwise connected to form a desired structure. As best shown in FIGS. 4 and 5, inner and outer pieces of sheet metal 102 and 104, respectively, are used to form the side structure 16, roof 18 and roof rail 100. A third piece of sheet metal 106 helps to form the B pillar 32 of the vehicle 12. Those skilled in the art will appreciate that the side structure 16, roof 18, roof rail 100, and B pillar 32 may have alternative configurations and/or constructions.

In the illustrated embodiment, the inflatable curtain 14, cover 26, and support means 120 are assembled as a module 150 that can be installed in the vehicle 12 as a unit. The module 150 is connected to the vehicle 12 by fastening means 152, such as a bolt or screw. The module 150 also includes a ramp assembly 160 and a bracket 200 positioned adjacent the roof rail 100 and the B pillar 32, as illustrated in FIGS. 4 and 5. The bracket 200 comprises the support means 120 adjacent the B pillar 32.

Figure 6:
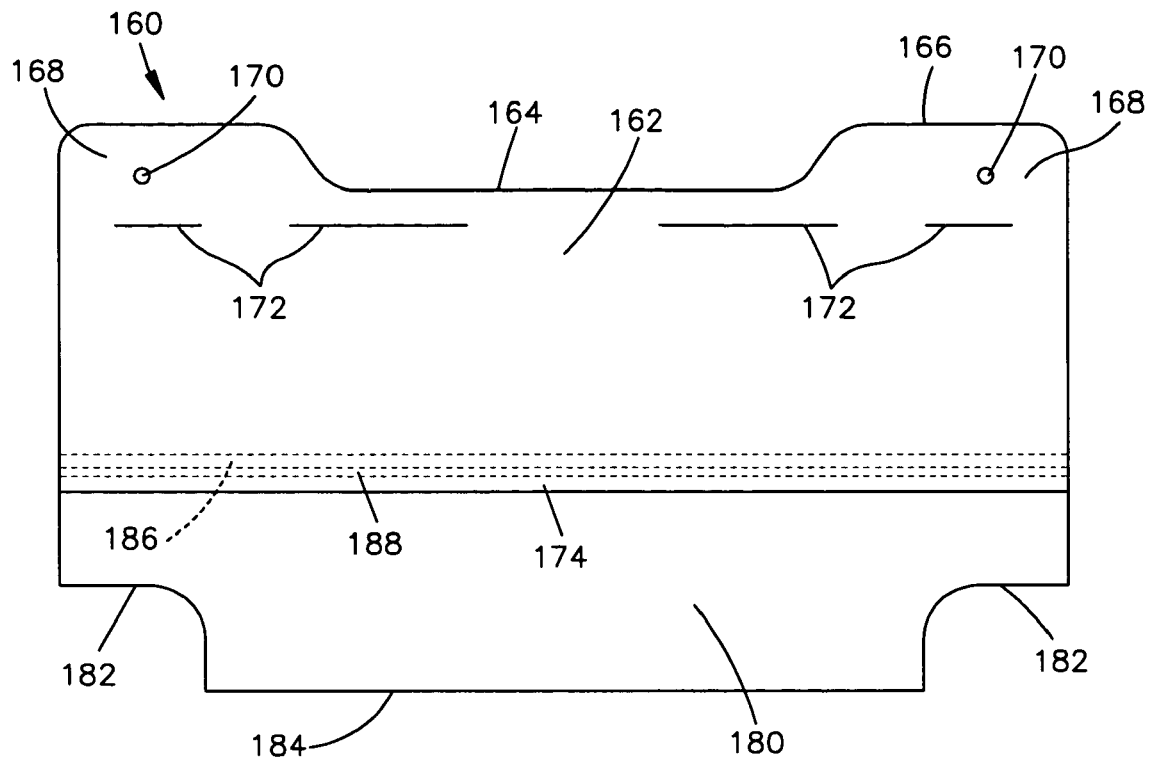
FIG. 6 is a front view of a portion of the apparatus of FIGS. 4 and 5.

The ramp assembly 160 is illustrated in FIG. 6. The ramp assembly 160 includes a connector piece 162 and a deployment ramp 180. The connector piece 162 is constructed of a generally flexible, non-resilient, and pliable material that offers little resistance to bending, twisting, or otherwise changing shape. The deployment ramp 180 is constructed of a material that is rigid and resilient in general and especially in comparison with the material used to construct the connector piece 162. The deployment ramp 180 and the connector piece 162 can be constructed as a single piece or as separate pieces connected to each other. Also, the deployment ramp 180 and the connector piece 162 can be constructed of different types of material or of the same type of material.

As an example, the connector piece 162 may be constructed of a fabric material and the deployment ramp 180 may be constructed of a plastic material. More specifically, the connector piece 162 may be constructed of a woven nylon fabric material, and the deployment ramp 180 may be constructed of a molded thermoplastic elastomer (TPE) material. The material used to construct the deployment ramp 180 may exhibit some degree of flexibility. In any event, however, the deployment ramp 180 is substantially more rigid than the connector piece 162.

As another example, the connector piece 162 and the deployment ramp 180 may be constructed of the same type of plastic material, such as a molded TPE material. In this example, the connector piece 162 and the deployment ramp 180 can be molded as a single piece of material or can be molded as separate pieces that are connected to each other. The respective configurations of the deployment ramp 180 and connector piece 162 may be selected so as to provide desired characteristics. The deployment ramp 180 may have a configuration, such as a relatively thick or ribbed configuration, that provides the ramp with a desired degree of rigidity. The connector piece 162 may have a configuration, such as a relatively thin configuration, that provides the connector piece with a desired degree of flexibility.

The connector piece 162 may have a variety of shapes or configurations designed to accommodate a particular construction of the vehicle 12 and/or module 150. In the embodiment illustrated in FIG. 6, the connector piece 162 has a generally elongated rectangular configuration with a cutout portion 164 located centrally along an upper edge 166 of the connector piece. The cutout portion 164 helps define tab portions 168 that may include apertures 170 for receiving fasteners. The connector piece 162 may also include slits 172 through which portions of the module 150, such as the bracket 200 or cover 26, may extend.

The deployment ramp 180 may have a variety of shapes or configurations designed to accommodate a particular construction of the vehicle 12 and/or module 150. In the embodiment illustrated in FIG. 6, the deployment ramp 180 has a generally elongated rectangular configuration with cutout corner portions 182 spaced along a lower edge 184 of the deployment ramp.

The connector piece 162 and the deployment ramp 180 are positioned such that a lower edge portion 174 of the connector piece overlies an upper edge portion 186 of the deployment ramp 180. These overlying portions 174 and 186 are interconnected to secure the connector piece 162 to the deployment ramp 180. In the embodiment illustrated in FIG. 6, stitching 188 (e.g., nylon thread) interconnects the overlying portions 174 and 186. Alternative means, such as adhesives, ultrasonic welds, mechanical fasteners, or combinations thereof, could also be used to interconnect the overlying portions 174 and 186.

The bracket 200 (FIGS. 4 and 5) may have a variety of shapes or configurations designed to accommodate a particular construction of the vehicle 12 and/or module 150. The bracket 200 includes a main portion 202 that is positioned adjacent the roof rail 100 when installed in the vehicle 12 as shown in FIGS. 4 and 5. A tab portion 204 extends transversely to the main portion 202 from an upper edge portion 206 of the main portion. The bracket 200 may also include a reinforcing portion 210 that at least partially overlies the tab portion 204.

The bracket 200 also includes a ramp support portion 220 that extends transversely to the main portion 202 from a lower edge portion 222 of the main portion. A flange portion 224 may extend transversely to the ramp support portion 220 from an edge portion of the ramp support portion opposite the main portion 202.

The bracket 200 is constructed of a piece of high-strength material, such as metal, that may be formed through a variety of metalworking operations, such as stamping, hydroforming, bending, and machining. Alternative materials, such as plastics or composites, and alternative constructions could also be used to form the bracket 200. For example, the reinforcing portion 210 of the bracket 200 and the remainder of the bracket could be formed as a single piece of material or as separate pieces of material.

In the assembled condition of the module 150 shown in FIGS. 4 and 5, the upper edge portion 70 of the inflatable curtain 14, and a tab portion 168 of the connector piece 162 are positioned between the tab portion 204 and the reinforcing portion 210. The fastener 152 extends through the reinforcing portion 210, inflatable curtain 14, connector piece 162, and tab portion 204 and is screwed into the roof rail 100 to secure the module 150 fixedly to the vehicle 12. The fastener 152 may also extend through the cover 26 (not shown in FIGS. 4 and 5) to connect the cover to the vehicle 12. When installed in the vehicle 12, the module 150 is positioned adjacent the roof rail 100 near the intersection of the side structure 16 and roof 18. The bracket 200 may include a projection 240, such a hook or clip, that may be used initially to help support the module 150 in the vehicle 12 while the fasteners 152 are installed.

When the module 150 is installed in the vehicle 12, the main portion 202 of the bracket 200 extends along the roof rail 100 in a direction generally downward and outboard from the vehicle roof 18, as viewed in FIGS. 4 and 5. The ramp support portion 220 extends transversely to the main portion 202 in a direction generally away from the vehicle side structure 16, diagonally downward and inboard of the vehicle side structure, as viewed in FIGS. 4 and 5. The main portion 202 and the ramp support portion 220 form a channel 242 for receiving the inflatable curtain 14, cover 26, and ramp assembly 160 in the stowed condition (FIG. 4). The inflatable curtain 14, when in the stowed condition, can be rolled, folded, or a combination of rolled and folded.

In the stowed condition, the deployment ramp 180 of the ramp assembly 160 is positioned extending from the ramp support portion 220 toward a flange portion 244 of the reinforcing portion 210. The flange portion 244 may help retain the inflatable curtain 14 in the stowed condition. The module 150 may include means (not shown), such as a strap or tether with a tear seam, for holding the deployment ramp 180 in the stowed position illustrated in FIG. 4. The deployment ramp 180, when in the stowed position, may help maintain and support the inflatable curtain 14 in the stowed position in the channel 242.

The module 150 also includes a ramp assembly 250 positioned adjacent the roof rail 100 and C pillar 34, as illustrated in FIGS. 7 and 8. Adjacent the C pillar 34, the support means 120 comprises a support clip 280.

Figure 9:
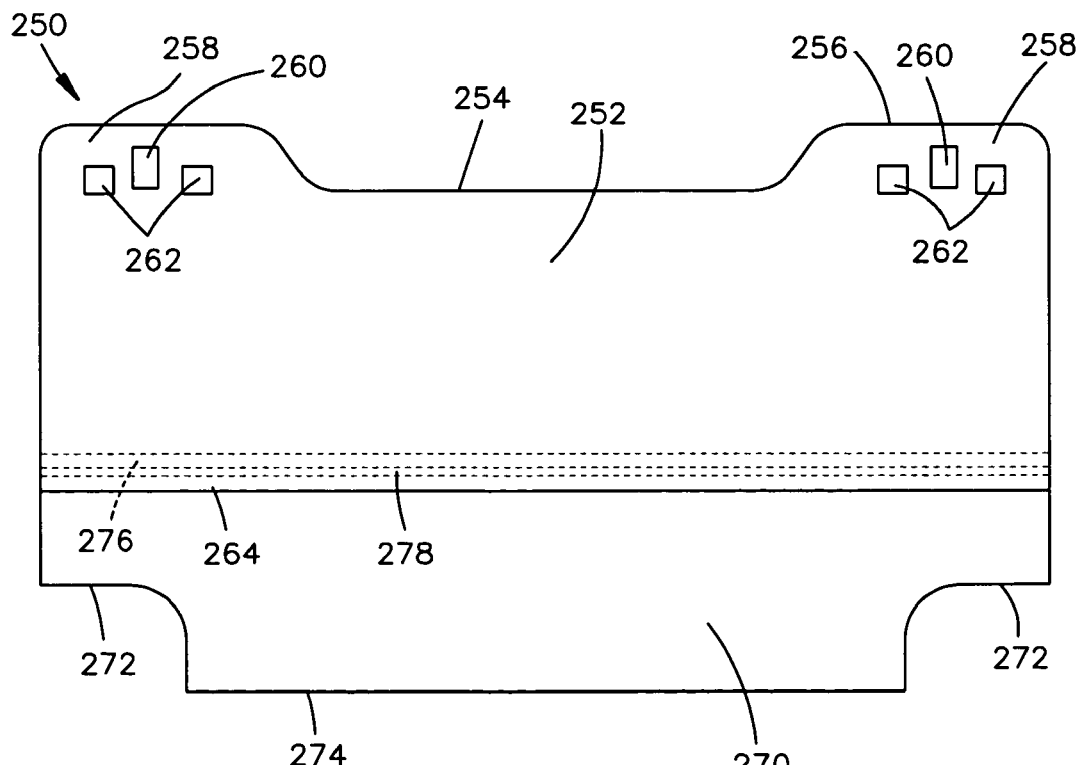
FIG. 9 is a front view of a portion of the apparatus of FIGS. 7 and 8.

The ramp assembly 250 is illustrated in FIG. 9. The ramp assembly 250 includes a connector piece 252 and a deployment ramp 270. The connector piece 252 is constructed of a generally flexible, non-resilient, and pliable material that offers little resistance to bending, twisting, or otherwise changing shape. The deployment ramp 270 is constructed of a material that is rigid and resilient in general and especially in comparison with the material used to construct the connector piece 252. For example, the connector piece 252 may be constructed of a fabric material, and the deployment ramp 270 may be constructed of a plastic material. More specifically, the connector piece 252 may be constructed of a woven nylon fabric material and the deployment ramp 270 may be constructed of a molded thermoplastic elastomer (TPE) material. The material used to construct the deployment ramp 270 may exhibit some degree of flexibility. In any event, however, the deployment ramp 270 is substantially more rigid than the connector piece 252.

The connector piece 252 may have a variety of shapes or configurations designed to accommodate a particular construction of the vehicle 12 and/or module 150. In the embodiment illustrated in FIG. 9, the connector piece 252 has a generally elongated rectangular configuration with a cutout portion 254 located centrally along an upper edge 256 of the connector piece. The cutout portion 254 defines tab portions 258 that may include apertures 260 for receiving fasteners. The tab portions 258 may also include apertures 262 for receiving retention members, as described below.

The deployment ramp 270 may have a variety of shapes or configurations designed to accommodate a particular construction of the vehicle 12 and/or module 150. In the embodiment illustrated in FIG. 9, the deployment ramp 270 has a generally elongated rectangular configuration with cutout corner portions 272 spaced along a lower edge 274 of the deployment ramp.

The connector piece 252 and the deployment ramp 270 are positioned such that a lower edge portion 264 of the connector piece overlies an upper edge portion 276 of the deployment ramp 270. These overlying portions 264 and 276 are interconnected to secure the connector piece 252 to the deployment ramp 270. In the embodiment illustrated in FIG. 9, stitching 278 (e.g., nylon thread) interconnects the overlying portions 264 and 276. Alternative means, such as adhesives, ultrasonic welds, mechanical fasteners, or combinations thereof, could also be used to interconnect the overlying portions 264 and 276.

In the embodiment illustrated in FIGS. 7 and 8, the support clip 280 has a generally U-shaped cross-section and includes overlying first and second clip plates 282 and 284, respectively. This is best shown in FIG. 7A. The first and second clip plates 282 and 284 may have a variety of shapes or configurations designed to accommodate a particular construction of the vehicle 12 and/or module 150. The first and second clip plates 282 and 284 have respective fastener receiving apertures 285 that are aligned with each other.

The support clip 280 is constructed of a piece of high-strength material, such as metal. Alternative materials, such as plastics or composites, and alternative constructions could also be used to form the support clip 280. For example, the first and second clip plates 282 and 284 of the support clip 280 could be formed as separate pieces of material instead of the single piece shown in FIGS. 7 and 8.

In the assembled condition of the module 150 shown in FIGS. 7 and 8, the upper edge portion 70 of the inflatable curtain 14 and a tab portion 258 of the connector piece 252 are positioned between the first and second clip plates 282 and 284 of the support clip 280. The cover 26 (not shown in FIGS. 7–9) could also have a portion positioned between the first and second clip plates 282 and 284. The first and second clip plates 282 and 284 may include respective retention members 286 (FIG. 7A) that extend toward each other and that may engage each other through an aperture 262 in the connecting portion 252 and an aperture 288 near the upper edge 70 of the inflatable curtain 14.

The fastener 152 extends through the first clip plate 282, inflatable curtain 14, tab portion 258, and second clip plate 284 and is screwed into the roof rail 100 to secure the module 150 fixedly to the vehicle 12. When installed in the vehicle 12, the module 150 is positioned adjacent the roof rail 100 near the intersection of the side structure 16 and roof 18.

In the embodiment illustrated in FIGS. 7 and 8, a member 290, such as a hook, may be secured to the connector piece 252 of the ramp assembly 250 by means (not shown), such as stitching, ultrasonic welding, or adhesives. The member 290 may project from the connector piece 252 and may be used initially to help support the module 150 in the vehicle 12 while the fasteners 152 are installed.

When the module 150 is installed in the vehicle 12 and the inflatable curtain 14 is in the stowed condition, the deployment ramp 270 of the ramp assembly 250 may help maintain and support the inflatable curtain 14 in the stowed position. The module 150 may include means (not shown), such as a strap or tether with a tear seam, for holding the deployment ramp 270 in the stowed position illustrated in FIG. 7.

The module 150, when in the installed condition of FIGS. 1, 4, and 7, extends along the roof rail 100 and along the intersection of the side structure 16 and the roof 18. The vehicle 12 includes a headliner 300 that extends along an inner surface 302 of the roof 18 of the vehicle. The headliner 300 has a portion 304 that extends at an acute angle relative to the roof 18 adjacent the module 150. The portion 304 of the headliner 300 overlies the module 150 and conceals the module in the vehicle 12. A terminal end 306 of the headliner 300 is in abutting engagement with a trim piece 310 (FIG. 4) overlying the B pillar 32, and a trim piece 312 (FIG. 7) overlying the C pillar 34.

Those skilled in the art will recognize that the configuration of the vehicle structure, and thus the spatial and interconnecting relationships between the vehicle structure (i.e., the side structure 16, roof 18, and roof rail 100) and the headliner 300, trim piece 310 and module 150, may vary depending upon the particular design of the vehicle 12. Therefore, it should be recognized that the vehicle structure illustrated in FIGS. 4, 5, 7, and 8 and the spatial and interconnecting relationships between the vehicle structure and the headliner 300, trim pieces 310 and 312, and module 150 is for illustrative purposes and may vary without departing from the spirit of the present invention.

The vehicle 12 includes a sensor mechanism 350 (shown schematically in FIGS. 1 and 2) for sensing the occurrence of an event for which inflation of the inflatable curtain 14 is desired, such as a side impact to the vehicle 12 and/or a vehicle rollover. Upon sensing the occurrence of such an event, the sensor mechanism 350 provides an electrical signal over lead wires 352 to the inflator 24. The electrical signal causes the inflator 24 to be actuated in a known manner. The inflator 24, when actuated, discharges fluid under pressure into the inflatable curtain 14.

The inflatable curtain 14 inflates under the pressure of the inflation fluid from the inflator 24. This causes the cover 26 to open, which permits the curtain to inflate away from the roof 18 in a downward direction as shown in the drawings and in a downward direction with respect to the direction of forward travel of the vehicle 12 into the position illustrated in FIGS. 2, 5, and 8.

The inflatable curtain 14, when inflated, extends along the side structure 16 of the vehicle 12 and is positioned between the side structure and any occupant of the vehicle. The inflatable curtain 14 covers portions of the vehicle side structure that extend between the A pillar 30 and the C pillar 34 of the vehicle 12 and may overlie portions of the A pillar, C pillar, and the B pillar 32 of the vehicle. The inflatable curtain 14, when inflated, may be positioned between the vehicle side structure 16 and the front and rear vehicle seating 44 and 46.

Those skilled in the art will appreciate that the extent and coverage of the inflatable curtain 14 in the vehicle 12 may vary. For example, the extent and coverage of the inflatable curtain 14 may vary depending on a variety of factors, such as the architecture of the vehicle 12, the position of the inflatable curtain 14 in the vehicle, and the desired extent or coverage of the inflatable curtain.

The inflatable curtain 14, when inflated, helps to protect a vehicle occupant in the event of a vehicle rollover or a side impact to the vehicle 12. The inflatable curtain 14 may cover an area of the side structure 16 extending from the A pillar 30 to the C pillar 34 and from the roof 18 down to adjacent or below the side windows 40 and 42. The inflatable curtain 14, when inflated, helps to absorb the energy of impacts with the curtain and helps to distribute the impact energy over a large area of the curtain.

Referring to FIGS. 4 and 5, the deployment ramp 180 helps to deflect or otherwise direct the inflatable curtain 14 to inflate inboard of the trim piece 310, between the trim piece and occupants of the vehicle 12. During inflation of the inflatable curtain 14, the flexible connector piece 162 permits the deployment ramp 180 to move from the position of FIG. 4 toward the position of FIG. 5. The fabric construction of the connector piece 162 is sufficiently non-resilient and flexible so as to permit substantially unrestricted movement of the deployment ramp 180. This allows the deployment ramp 180 to reach the deployed position quickly and with little resistance so that the inflatable curtain 14 may deploy with little or no restriction from the deployment ramp. The deployment ramp 180, when deployed, extends inboard of the trim piece 310 and overlies the area where the trim piece 310, side structure 16, and flange portion 224 converge.

The deployment ramp 180 provides a barrier between the inflatable curtain 14 and trim piece 310 and thus helps prevent the curtain from getting caught on the trim piece or inflating between the trim piece and the side structure 16. The deployment ramp 180 directs the inflatable curtain 14 to deploy in an inboard direction (i.e., to the left as viewed in FIGS. 3–5) around the trim piece 310. As shown in FIG. 5, the deployment ramp 180 may bend or flex under the force of the inflated curtain 14. Even under such bending or flexure, however, the deployment ramp 180 remains sufficiently rigid and resilient so as to direct the inflatable curtain 14 inboard of the trim piece 310. The ramp support portion 220 of the bracket 200 helps support the deployment ramp 180 during deployment of the inflatable curtain 14.

Referring to FIGS. 7 and 8, the deployment ramp 270 helps to deflect or otherwise direct the inflatable curtain 14 to inflate inboard of the trim piece 312, between the trim piece and occupants of the vehicle 12. During inflation of the inflatable curtain 14, the flexible connecting portion 252 permits the deployment ramp 270 to move from the position of FIG. 7 toward the position of FIG. 8. The fabric construction of the connecting portion 252 is sufficiently non-resilient and flexible so as to permit substantially unrestricted movement of the deployment ramp 270. This allows the deployment ramp 270 to reach the deployed position quickly and with little resistance so that the inflatable curtain 14 may deploy with little or no restriction from the deployment ramp. The deployment ramp 270, when deployed, extends inboard of the trim piece 312 and overlies the area where the trim piece 312 terminates adjacent the side structure 16.

The deployment ramp 270 provides a barrier between the inflatable curtain 14 and trim piece 312 and thus helps prevent the curtain from getting caught on the trim piece or inflating between the trim piece and the side structure 16. The deployment ramp 270 directs the inflatable curtain 14 to deploy in an inboard direction (i.e., to the left as viewed in FIGS. 7 and 8) around the trim piece 312. As shown in FIG. 8, the deployment ramp 270 may bend or flex under the force of the inflated curtain 14. Even under such bending or flexure, however, the deployment ramp 270 remains sufficiently rigid and resilient so as to direct the inflatable curtain 14 to deploy inboard of the trim piece 312.

From the above description of the invention, those skilled in the art will perceive improvements, changes and modifications. For example, alternative flexible materials, such as plastic films could be used to construct the connector piece. Alternative rigid materials, such as metals or composites, could be used to construct the deployment ramp. Such improvements, changes and modifications within the skill of the art are intended to be covered by the appended claims.

Having described the invention, the following is claimed:

1. An apparatus for helping to protect an occupant of a vehicle that has a roof, a side structure, and a trim piece overlying the side structure, said apparatus comprising:
    an inflatable curtain that is inflatable away from the vehicle roof to a position adjacent the side structure of the vehicle;
    a deployment ramp movable from a stored position to a deployed position for directing said inflatable curtain to deploy inboard of the trim piece, said deployment ramp being constructed of a first material that is sufficiently resilient and rigid to direct said inflatable curtain to deploy inboard of the trim piece; and
    a connector piece for connecting said deployment ramp to the vehicle, said connector piece having a first portion secured to said deployment ramp and a second portion connectable to the vehicle, said connector piece being constructed of a second material different than said first material that is sufficiently non-resilient and flexible so as to permit substantially unrestricted movement of said deployment ramp to said deployed position.

2. The apparatus recited in claim 1, wherein said first material is a plastic material.

3. The apparatus recited in claim 2, wherein said plastic material is a thermoplastic elastomer material.

4. The apparatus recited in claim 1, wherein said deployment ramp when in said deployed position extends inboard of the trim piece.

5. The apparatus recited in claim 1, wherein said deployment ramp when in said deployed position overlies a trim piece on a B pillar of the vehicle.

6. The apparatus recited in claim 1, wherein said deployment ramp when in said deployed position overlies a trim piece on a C pillar of the vehicle.

7. The apparatus recited in claim 1, further comprising a bracket for supporting the inflatable curtain in the vehicle, said bracket comprising a ramp support portion for supporting said deployment ramp in said deployed position.

8. The apparatus recited in claim 7, wherein said ramp support portion is constructed of metal.

9. The apparatus recited in claim 7, wherein said bracket further comprises a portion for clamping onto said inflatable curtain and said connector piece.

10. The apparatus recited in claim 7, wherein said deployment ramp helps maintain said inflatable curtain positioned in a channel prior to deployment of said inflatable curtain.

11. The apparatus recited in claim 1, further comprising a fabric sheath for at least partially surrounding said inflatable curtain in a stored position.

12. The apparatus recited in claim 1, further comprising an inflation fluid source for providing inflation fluid for inflating said inflatable curtain.

13. The apparatus recited in claim 1, wherein said vehicle has a headliner, said inflatable curtain engaging said headliner in said deployed position.

14. The apparatus recited in claim 1, wherein said connector piece and said deployment ramp having edge portions that overlap each other.

15. The apparatus recited in claim 1, wherein said connector piece and said deployment ramp have edge portions, said edge portion of said connector piece overlying said edge portion of said deployment ramp.

16. An apparatus for helping to protect an occupant of a vehicle that has a roof, a side structure, and a trim piece overlying the side structure, said apparatus comprising:
    an inflatable curtain that is inflatable away from the vehicle roof to a position adjacent the side structure of the vehicle;
    a deployment ramp movable from a stored position to a deployed position for directing said inflatable curtain to deploy inboard of the trim piece, said deployment ramp having a construction that is sufficiently resilient and rigid to direct said inflatable curtain to deploy inboard of the trim piece; and
    a connector piece for connecting said deployment ramp to the vehicle, said connector piece having a first portion secured to said deployment ramp and a second portion connectable to the vehicle, said connector piece having a construction that is sufficiently non-resilient and flexible so as to permit substantially unrestricted movement of said deployment ramp to said deployed position, wherein said connector piece is constructed of a fabric material.

17. The apparatus recited in claim 16, further comprising stitching that connects said first portion of said connector piece to said deployment ramp.

18. An apparatus for directing an inflatable curtain to deploy inboard of a trim piece overlying a side structure of a vehicle, said apparatus comprising: a plastic deployment ramp for directing the inflatable curtain to deploy inboard of the trim piece; and a fabric connector piece for connecting said deployment ramp to the vehicle, said connector piece having a first portion connected to said deployment ramp and a second portion connectable to the vehicle.

19. The apparatus recited in claim 18, wherein said connector piece is stitched to said deployment ramp.

* * * * *